(12) United States Patent
Schuler et al.

(10) Patent No.: US 9,135,091 B2
(45) Date of Patent: Sep. 15, 2015

(54) COMMUNICATING EVENTS OR DATA BETWEEN APPLICATION COMPONENTS

(75) Inventors: Patrick Schuler, Zurich (CH); Bradley R. Pettit, Los Gatos, CA (US)

(73) Assignee: Microsoft Technology Licensing, LLC, San Jose, CA (US)

(*) Notice: Subject to any disclaimer, the term of this patent is extended or adjusted under 35 U.S.C. 154(b) by 925 days.

(21) Appl. No.: 12/418,317

(22) Filed: Apr. 3, 2009

(65) Prior Publication Data
US 2010/0257540 A1 Oct. 7, 2010

(51) Int. Cl.
*G06F 3/00* (2006.01)
*G06F 9/44* (2006.01)
*G06F 9/46* (2006.01)
*G06F 13/00* (2006.01)
*G06F 9/54* (2006.01)

(52) U.S. Cl.
CPC .................................. *G06F 9/542* (2013.01)

(58) Field of Classification Search
USPC .......................................... 719/318; 709/223
See application file for complete search history.

(56) References Cited

U.S. PATENT DOCUMENTS

| | | | |
|---|---|---|---|
| 5,787,470 A | 7/1998 | DeSimone et al. | |
| 5,978,842 A | 11/1999 | Noble et al. | |
| 5,999,978 A * | 12/1999 | Angal et al. | 709/229 |
| 6,112,231 A | 8/2000 | DeSimone et al. | |
| 6,138,141 A | 10/2000 | DeSimone et al. | |
| 6,226,692 B1 | 5/2001 | Miloushev et al. | |
| 6,262,729 B1 | 7/2001 | Marcos et al. | |
| 6,438,618 B1 | 8/2002 | Lortz et al. | |
| 6,446,136 B1 * | 9/2002 | Pohlmann et al. | 719/318 |
| 6,505,241 B2 | 1/2003 | Pitts | |
| 6,574,630 B1 * | 6/2003 | Augustine et al. | 1/1 |
| 6,651,217 B1 | 11/2003 | Kennedy et al. | |
| 6,704,804 B1 | 3/2004 | Wilson et al. | |
| 6,751,665 B2 | 6/2004 | Philbrick et al. | |
| 6,832,355 B1 | 12/2004 | Duperrouzel et al. | |
| 7,216,292 B1 | 5/2007 | Snapper et al. | |
| 7,398,473 B2 | 7/2008 | Stoner | |
| 7,424,717 B2 | 9/2008 | Blevins | |
| 7,437,376 B2 | 10/2008 | Sikchi et al. | |
| 7,441,253 B2 | 10/2008 | Atkinson | |
| 7,460,443 B2 | 12/2008 | Elmers | |
| 7,475,384 B2 | 1/2009 | Heath | |
| 7,483,870 B1 | 1/2009 | Mathew | |
| 7,765,523 B2 | 7/2010 | Kooy | |
| 7,899,370 B2 * | 3/2011 | Nakajima | 399/258 |

(Continued)

FOREIGN PATENT DOCUMENTS

| | | |
|---|---|---|
| WO | WO2004/027606 | 4/2004 |
| WO | WO-2005093603 | 10/2005 |

OTHER PUBLICATIONS

"Final Office Action", U.S. Appl. No. 12/471,026, (Oct. 28, 2011), 22 pages.

(Continued)

*Primary Examiner* — Diem Cao
(74) *Attorney, Agent, or Firm* — Micah Goldsmith; Judy Yee; Micky Minhas

(57) ABSTRACT

This document describes tools capable of communicating events or event data between application components. These tools allow an application component to communicate an event and event data to another application component even if the two application components are in separate layers or do not exist at the same time.

19 Claims, 4 Drawing Sheets

(56) References Cited

U.S. PATENT DOCUMENTS

| | | | |
|---|---|---|---|
| 8,131,676 | B2 | 3/2012 | Pettit |
| 8,132,181 | B2* | 3/2012 | Lenharth et al. .............. 719/318 |
| 8,176,160 | B2* | 5/2012 | Appleton et al. ............. 709/223 |
| 8,239,880 | B1* | 8/2012 | Caccavale et al. ............ 719/318 |
| 8,392,840 | B2 | 3/2013 | Sharma |
| 8,621,376 | B2 | 12/2013 | Kim et al. |
| 2002/0118300 | A1 | 8/2002 | Middleton |
| 2002/0156556 | A1 | 10/2002 | Ruffner |
| 2002/0156840 | A1 | 10/2002 | Ulrich et al. |
| 2002/0196279 | A1 | 12/2002 | Bloomfield et al. |
| 2003/0188017 | A1 | 10/2003 | Nomura |
| 2004/0057348 | A1 | 3/2004 | Shteyn |
| 2004/0107266 | A1 | 6/2004 | Tanaka et al. |
| 2004/0218894 | A1 | 11/2004 | Harville et al. |
| 2005/0038791 | A1* | 2/2005 | Ven ............................... 707/100 |
| 2005/0055458 | A1 | 3/2005 | Mohan et al. |
| 2005/0114757 | A1 | 5/2005 | Sahota et al. |
| 2005/0172000 | A1 | 8/2005 | Nakamura et al. |
| 2005/0172309 | A1 | 8/2005 | Risan et al. |
| 2005/0188350 | A1 | 8/2005 | Bent et al. |
| 2005/0204148 | A1 | 9/2005 | Mayo et al. |
| 2005/0273779 | A1 | 12/2005 | Cheng et al. |
| 2005/0278737 | A1 | 12/2005 | Ma |
| 2006/0021057 | A1 | 1/2006 | Risan et al. |
| 2006/0047662 | A1 | 3/2006 | Barik et al. |
| 2006/0070083 | A1 | 3/2006 | Brunswig et al. |
| 2006/0074981 | A1 | 4/2006 | Mauceri |
| 2006/0143236 | A1 | 6/2006 | Wu |
| 2006/0179080 | A1 | 8/2006 | Meek et al. |
| 2006/0196950 | A1 | 9/2006 | Kiliccote |
| 2006/0224690 | A1 | 10/2006 | Falkenburg et al. |
| 2006/0248451 | A1 | 11/2006 | Szyperski et al. |
| 2006/0270462 | A1 | 11/2006 | Chi |
| 2007/0033652 | A1 | 2/2007 | Sherwani et al. |
| 2007/0050320 | A1 | 3/2007 | Carrier |
| 2007/0124460 | A1 | 5/2007 | McMullen et al. |
| 2007/0139441 | A1 | 6/2007 | Lucas et al. |
| 2007/0226353 | A1 | 9/2007 | Ruul |
| 2007/0255811 | A1 | 11/2007 | Pettit et al. |
| 2008/0033806 | A1 | 2/2008 | Howe |
| 2008/0064351 | A1 | 3/2008 | Landschaft |
| 2008/0114810 | A1 | 5/2008 | Malek |
| 2008/0134250 | A1 | 6/2008 | Liu |
| 2008/0140714 | A1 | 6/2008 | Rhoads et al. |
| 2008/0205205 | A1 | 8/2008 | Chiang |
| 2008/0215345 | A1* | 9/2008 | Hollingsworth et al. ......... 705/1 |
| 2008/0282083 | A1 | 11/2008 | Risan et al. |
| 2008/0301803 | A1 | 12/2008 | Ontaneda |
| 2008/0313650 | A1 | 12/2008 | Arnquist |
| 2008/0319856 | A1 | 12/2008 | Zito |
| 2009/0077211 | A1* | 3/2009 | Appleton et al. ............. 709/223 |
| 2009/0138502 | A1 | 5/2009 | Kalaboukis et al. |
| 2009/0198744 | A1 | 8/2009 | Nakamura |
| 2009/0204719 | A1 | 8/2009 | Simongini et al. |
| 2009/0217146 | A1 | 8/2009 | Goldfarb |
| 2009/0307212 | A1* | 12/2009 | Ramot et al. ...................... 707/5 |
| 2010/0095337 | A1 | 4/2010 | Dua |
| 2010/0165877 | A1 | 7/2010 | Shukla et al. |
| 2010/0241527 | A1 | 9/2010 | McKenna et al. |
| 2010/0241669 | A1 | 9/2010 | Pettit |
| 2010/0257216 | A1 | 10/2010 | Pettit |
| 2010/0299620 | A1 | 11/2010 | Sharma |
| 2011/0099500 | A1 | 4/2011 | Smith et al. |

OTHER PUBLICATIONS

"Notice of Allowance", U.S. Appl. No. 12/418,224, (Nov. 28, 2011), 8 pages.

"Load Content While Scrolling", posted at WebResource Depot, (Jun. 3, 2008), 3 pages.

"Non-Final Office Action", U.S. Appl. No. 12/406,816, (Jun. 27, 2011), 14 pages.

"Non-Final Office Action", U.S. Appl. No. 12/418,224, (Jun. 9, 2011), 11 pages.

"Non-Final Office Action", U.S. Appl. No. 12/471,026, (Jun. 23, 2011), 18 pages.

Barton, John et al., "Sensor-Enhanced Mobile Web Clients: an XForms Approach", In Proceedings of WWW 2003,(May 2003), pp. 80-89.

Berseth, Matt, "asp.net Ajax Auto-Complete Control", (Jan. 10, 2008), 5 pages.

Merlino, Andrew "Paging in asp.net", (Sep. 10, 2003), 4 pages.

"Best Practices for NI TestStand User Interface Development", Retrieved at <<http://zone.ni.com/devzone/cda/tut/p/id/7560, Jul. 15, 2008, pp. 10.

Clausen, Joern, "Attaching Data to Timeline Event", Retrieved at <<http://www.mail-archive.com/general©simile.mit.edu/msg00966.html>>, Mar. 10, 2007, pp. 2.

Hallberg, Aaron, "Attaching Custom Data to a Build", Retrieved at <<http://blogs.msdn.com/aaronhallberg/archive/2008/05/27/attaching-custom-data-to-a-build.aspx>>, May 27, 2008, pp. 3.

"Custom Event Classes", Retrieved at <<http://wiki.wxpython.org/CustomEventClasses>>, Feb. 4, 2009, p. 1.

"DMP-6000 Network High Definition Digital Signage Media Player & Content Distribution Server (CDS) Software platform", Retrieved from <http://www.gctglobal.com/Products/Set_Top_Box/set_top_box.html>, Jan. 2009.

"Set-Top Box Design Template", Retrieved from <http://msdn.microsoft.com/en-us/library/ms924238.aspx>, 2009.

"SeaChange IPTV", Retrieved from <http://www.schange.com/en-US/Docs/Public/products/IPTV_TVNav_BR_7-11-2008.pdf>.

"Data Binding Between Controls in Windows Forms", Retrieved from <http://msdn.microsoft.com/en-us/magazine/cc301575.aspx>, 2002.

"How to: Ensure Multiple Controls Bound to the Same Data Source Remain Synchronized", Retrieved from <http://msdn.microsoft.com/en-us/library/ms404299.aspx>, on Jan. 2009.

"Manipulating Data through a Binding Source", Retrieved from <http://my.safaribooksonline.com/032126892X/ch04lev1sec5>, Jan. 2009.

"Palm Prē", Retrieved from <<http://www.palm.com/us/products/phones/pre/>>on Apr. 24, 2009, Scroll down to "Connected Calendars and Contacts and click on See Gallery"—Images 6, 7 and 8, entitled "Contacts," "Linked Contact" and "Linked Contact",1-7.

"Orban/Coding Technologies AAC/aacPlus Player Plugin", Retreived at <http://www.orban.com/plugin/Read_Me.html>, Apr. 2008.

"Best Practices for NI TestStand User Interface Development", Retrieved from: http://zone.ni.com/devzone/cda/tut/p/id/7560 on Feb. 4, 2009., (Jul. 15, 2008),10 Pages.

Clausen, Joern "Attaching Data to Timeline Event", Retrieved from: http://www.mail-archive.com/general@simile.mit.edu/msg00966.html on Feb. 4, 2009., 2 Pages.

Hallberg, Aaron "Attaching Custom Data to a Build", Retrieved from: http://blogs.msdn.com/aaronhallberg/archive/2008/05/27/attaching-custom-data-to-a-build.aspx on Feb. 4, 2009, 3 Pages.

"Custom Event Classes", Retrieved from: http://wiki.wxpython.org/CustomEventClasses on Feb. 4, 2009., 1 Page.

"Final Office Action", U.S. Appl. No. 12/406,816, (Jan. 20, 2012),16 pages.

Faltstrom, P. "E.164 Number and DNS", Network Working Group, Retrieved from: <http://www.ietf.org/rfc/rfc2916.txt> on Jan. 4, 2012,(Sep. 2000),7 pages.

"Notice of Allowance", U.S. Appl. No. 12/471,026, (Oct. 9, 2012), 15 pages.

"Non-Final Office Action", U.S. Appl. No. 12/406,816, Jun. 20, 2014, 22 pages.

"Final Office Action", U.S. Appl. No. 12/406,816, Feb. 23, 2015, 27 pages.

* cited by examiner

COMMUNICATING EVENTS OR DATA BETWEEN APPLICATION COMPONENTS

BACKGROUND

Different application components, whether part of a same computer application or different computer applications, often need to send custom events and data between each other. In one current approach to enable this functionality, each application component implements a message handler and registers with a global message queue. One application component sends a message with data attached to the global message queue and another application component's message handler fetches the message with the data attached.

This current approach fails to operate when the application components do not have access to each other or the global messaging queue. This may occur due to the receiving application component not being in existence when the message is sent. It may also occur due to application components being located in different layers and thus not able to communicate with each other or the global messaging queue.

SUMMARY

This document describes tools capable of communicating events or event data between application components. These tools allow an application component to communicate an event or event data to another application component even if the two application components are in separate layers or do not exist at the same time.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes tools that allow different application components to communicate events to each other and share data with each other. The tools may provide this functionality even if the application components do not have access to each other, such as if they exist in separate layers. The tools may also provide this functionality even if one or more of the application components does not exist at the time an existing application component triggers an event. The application components may not even be aware that any other application components exist.

In one embodiment, the tools provide a way for an application component to communicate an event to an event-dispatching module. This event may be predefined, and thus defined prior to being triggered. It may also or instead be application-specific, and thus defined by the application in which the component resides rather than by an operating system, for example. The event includes event data associated with the event. The event-dispatching module communicates a notification to another application component that the event has occurred. This notification does not include the event data. The event dispatching module communicates the event data to an event-data store. The event-data store maintains the event data for access by the other application component. The event-data store also may maintain the event data for access by a still different application component, which did not receive a notification of the event. These application components may be part of the same application or different applications.

Example Environment

Figure 1:
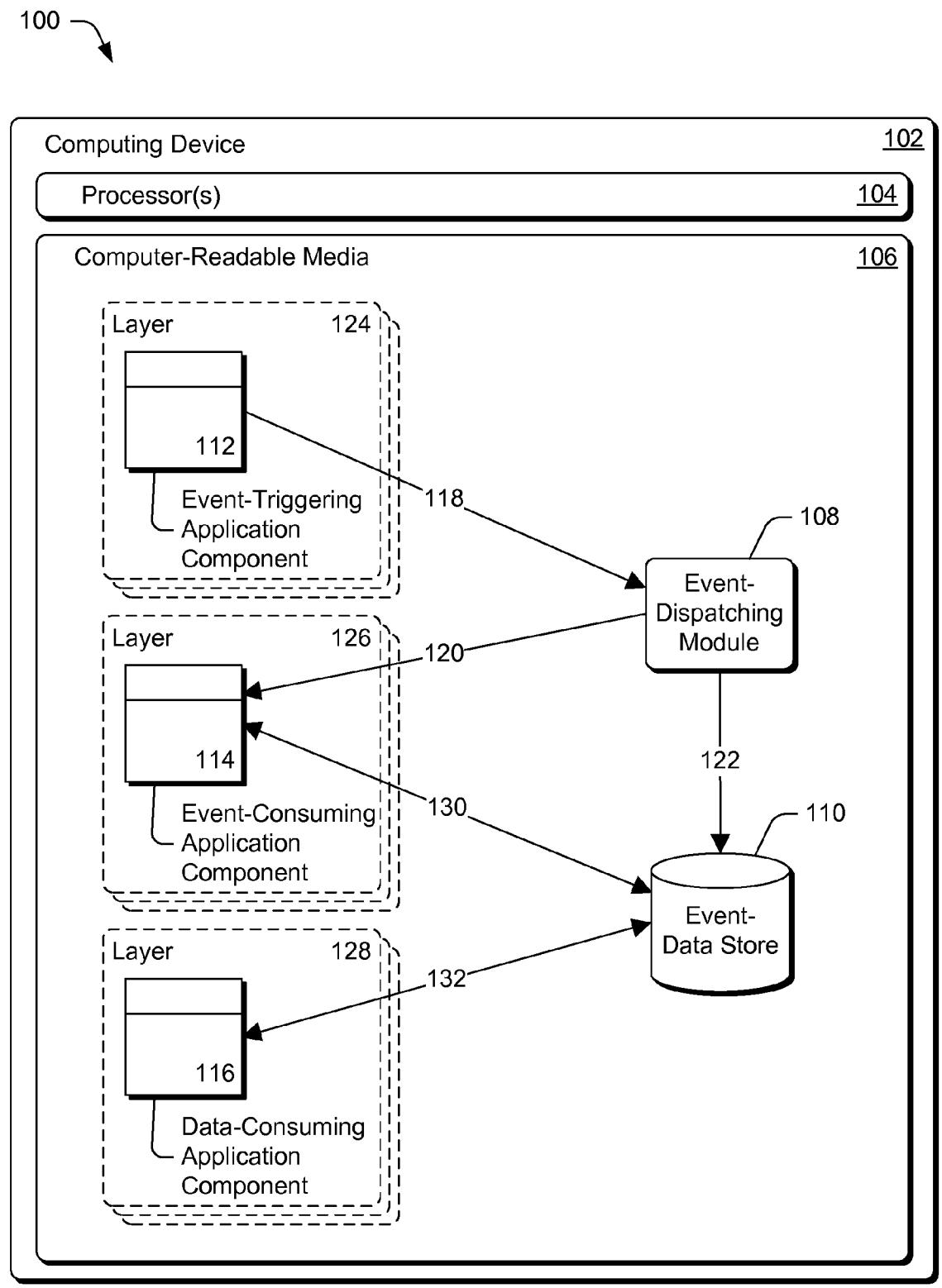
FIG. 1 is an illustration of an environment in which events or event data may be communicated between application components.

FIG. 1 is an illustration of an environment 100 in an example embodiment in which the tools may operate to enable application components to communicate events or event data between each other. Environment 100 includes a computing device 102, which may include a set-top box, a personal computer, a media player, or a smart phone to name a few. Computing device 102 includes one or more processors 104 and computer-readable media 106. Computer-readable media 106 contains or has access to an event-dispatching module 108, an event-data store 110, one or more event-triggering application components 112, one or more event-consuming application components 114, and one or more data-consuming application components 116.

The tools allow event-dispatching module 108 to receive events from application component(s) 112, which may include event data associated with the event. This receiving capability is illustrated by line 118. The tools allow event-dispatching module 108 to communicate a notification of one of the events to application component(s) 114. This communicating capability is illustrated by line 120. In this embodiment, the notification does not include the event data but in other embodiments it may include the event data. The tools also allow event-dispatching module 108 to communicate the event data to event-data store 110. This communicating capability is illustrated by line 122. The tools provide event-data store 110 with the capability to maintain the event data for access by application component(s) 114 and 116.

Application component(s) 112, 114, and 116 exist within one or more layers 124, 126, and 128, respectively, which isolate them from other components, including from other application components 112, 114, or 116. A layer may also isolate application components 112, 114, and 116 effective to prevent them from accessing the computer-readable media 106 or system resources on computing device 102 or communicating events and/or data between application components. In some cases layers approximate windows that are views of one or more applications in various combinations. The layers are comprised of software, hardware, or a combination of both designed to isolate all or part of an application or application component.

Event-dispatching module 108 and event-data store 110 are designed to communicate with the application component(s) 112, 114, and 116 through layers 124, 126, and 128, respectively. In one embodiment event-dispatching module 108 and event-data store 110 are part of a module (not shown) that creates the layers. In another embodiment, the module, which may create the layers, allows communication with event-dispatching module 108 and event-data store 110 even though they are external to the module.

Consider example layers created through a web-browser application running two or more web applications in separate windows or tabs. In this example each web application exists in a separate layer imposed by the web-browser. The web-browser either contains or allows access to event-dispatching module 108 and event-data store 110. The web applications containing application components 112, 114, and/or 116 are then able to communicate events and/or event data between each other.

The tools provide event-triggering application components 112 with a capability to trigger an event. This triggering involves communicating the event to event-dispatching module 108 and including associated event-data. The triggering capabilities are illustrated by line 118. The tools provide event-consuming application components 114 with the capability to receive a notification of the event from the event-dispatching module 108. This capability is illustrated by line 120.

The tools allow application components 114 to act in response to the notification. In one embodiment, an application component 114 retrieves event data from the event-data store 110 in response to the notification. This optional retrieval capability is illustrated by line 130. In another embodiment, application component 114 exits in response to the notification. In another embodiment, application component 114 logs the occurrence of the event in response to the notification.

The tools allow data-consuming application components 116 to receive event data from the event-data store 110. This receiving capability is illustrated by line 132. Application component(s) 116 receive the event data passively; they do not receive a notification of the event to which the data is associated. Application components 116 may bind to a data source that is associated with the event as part of this receiving. In one embodiment application component 116 receives the data by fetching the data from event-data store 110.

While only one computing device 102 is depicted in FIG. 1, other embodiments have items 108, 110, 112, 114, and 116 distributed in various configurations across two or more computing devices. Thus, one or more application components 112 may reside on a first computing device, one or more application components 114 and 116 and event-dispatching module 108 may reside on a second computing device, and event-data store 110 may reside on a third computing device. In this embodiment, the first, second, and third computing devices communicate with each other via a communication network. The communication network may be any network enabling communication between any two or more computing devices, such as the Internet, a local-area network, a wide-area network, a wireless network, a USB hub, or a combination of these (not shown).

FIG. 1 shows application components 112, 114, and 116 located in separate respective layers 124, 126, and 128. Other embodiments have various combinations of application components 112, 114, and 116 combined within the same layer. In one embodiment, application component 112 and two application components 114 reside in a first layer while application component 112 and application component 116 reside in a second layer. In this embodiment all of the components are able to communicate events and/or event data between each other through the event-dispatching module 108 and the event-data store 110.

FIG. 1 shows application components 112, 114, and 116 located within separate applications. Other embodiments have various combinations of application components 112, 114, and 116 combined within the same application, such as application components 112 and 114 residing in a single application and application component 116 residing in another application.

FIG. 1 shows application components 112, 114, and 116 existing at the same time. In other embodiments application components are not in existence at the same time and are still able to communicate with each other. In one embodiment, application component 112 communicates an event, with event data, to event-dispatching module 108. After the communication, application component 112 exits (i.e., ceases to exist). An instance of application component 116 is created that was not in existence when application component 112 existed. As part of application component 116's initialization, it retrieves the event data from event-data store 110. In this embodiment application component 114 and application components 112 and 116 did not coexist.

Note that one or more of the entities shown in FIG. 1 may be further divided, combined, and so on. Thus the environment 100 of FIG. 1 illustrates some of many possible environments capable of employing the described techniques.

Generally, any of the functions described herein can be implemented using software, firmware, hardware (e.g., fixed-logic circuitry), manual processing, or a combination of these implementations. The terms "tool" and "module," as used herein generally represent software, firmware, hardware, whole devices or networks, or a combination thereof. In the case of a software implementation, for instance, the tools or a module may represent program code that performs specified tasks when executed on a processor (e.g., CPU or CPUs). The program code can be stored in one or more computer-readable memory devices, such as computer-readable media 106. The features and techniques of the tools are platform-independent, meaning that they may be implemented on a variety of commercial computing platforms having a variety of processors.

Example Process for Communicating Between Application Components

The following discussion describes ways in which the tools may operate to enable application components to communicate events and/or event data between each other even if those application components are separated by one or more layers. Aspects of this process may be implemented in hardware, firmware, software, or a combination thereof. This process is shown as sets of blocks that specify operations performed by the tools, such as through one or more modules or devices, and are not necessarily limited to the order shown for performing the operations by the respective blocks. In portions of the following discussion reference may be made to environment 100 of FIG. 1 as well as to FIGS. 3 and 4.

Figure 2:
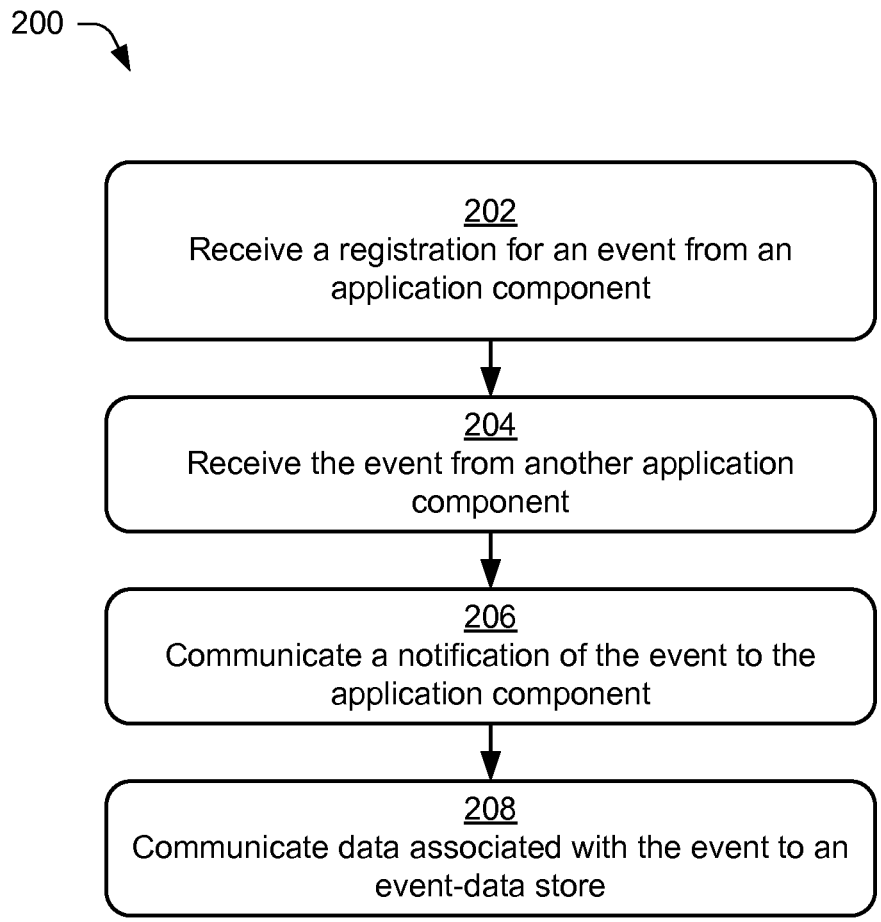
FIG. 2 is a flow diagram depicting an example process, including communicating events or event data between application components.

FIG. 2 is a flow diagram depicting an example process 200 for providing event and data communication from one application component to another application component. In the example process 200 the tools communicate an event and its data from an application component to another application component. An example user interface and system layout is described as part of this example process, though other user interfaces and system layouts are also contemplated.

Block 202 receives a registration for an event from an application component. This registration informs the entity performing the process that another application component (e.g., event-consuming application component 114) would like to receive a notification if the event is triggered (e.g., by event-triggering application component 112).

Figure 3:
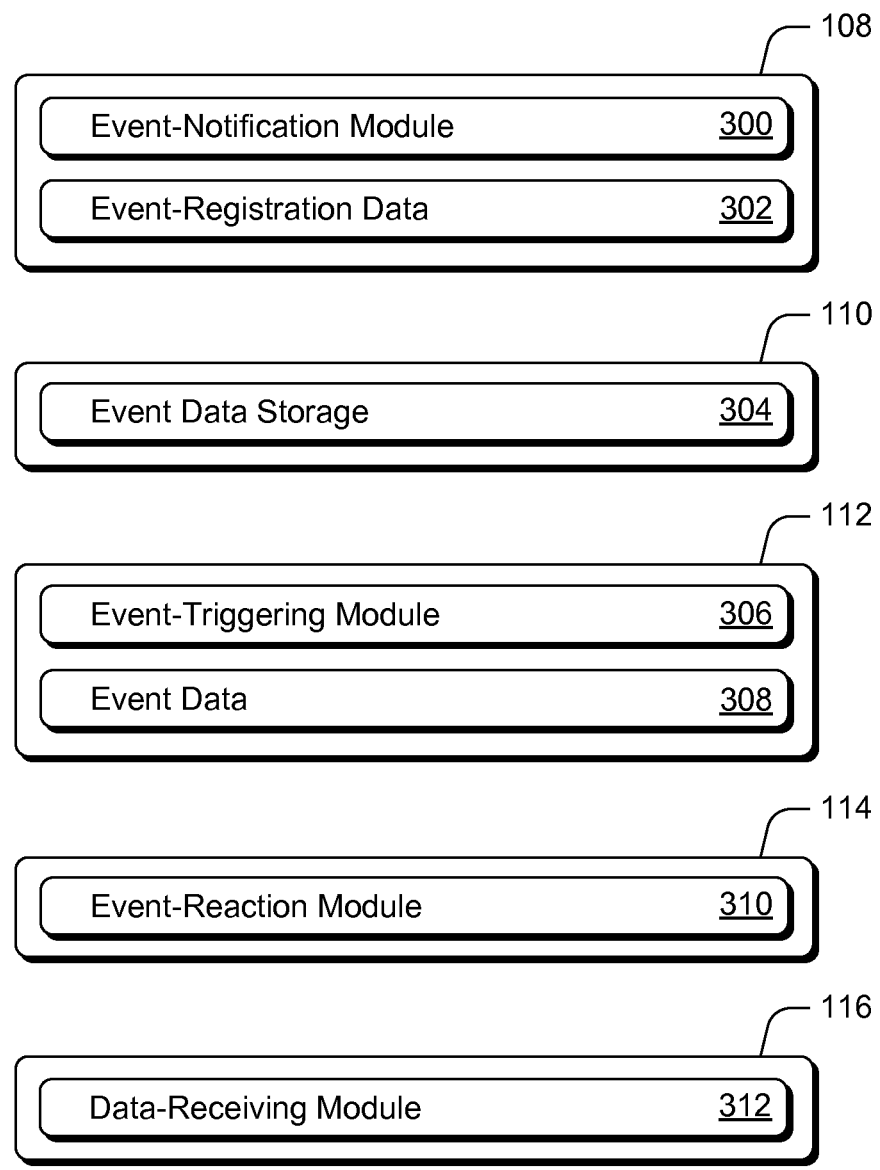
FIG. 3 is a detailed illustration of examples of items shown in FIG. 1.
Figure 4:
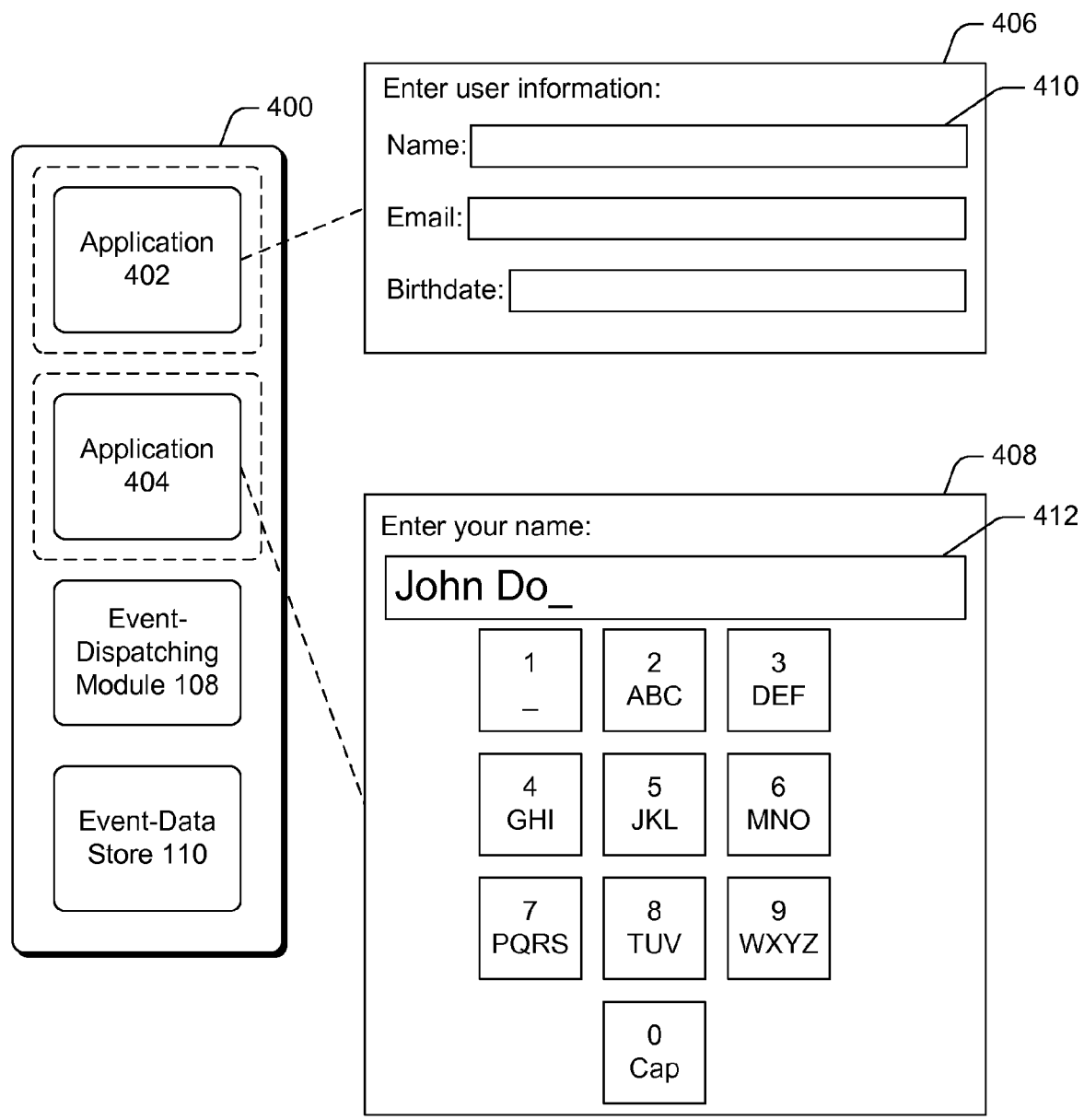
FIG. 4 is an illustration of an example computing device and components relating to the process of FIG. 2.

By way of example, consider FIGS. 3 and 4. FIG. 3 depicts an embodiment for performing process 200 of FIG. 2. Items 108, 110, 112, 114, and 116 of FIG. 3 correspond with those same-numbered items of FIG. 1. Event-dispatching module 108 includes event-notification module 300 and event-registration data 302. Event-data store 110 includes event-data storage 304. Event-triggering application component 112 includes event triggering module 306 and event data 308. Event-consuming application component 114 includes event-reaction module 310. Data-consuming application component 116 includes data-receiving module 312.

Continuing the example, event-notification module 300 receives a registration from application component 114. This registration informed event-notification module 300 that application component 114 would like to receive notification of a particular event when that event is triggered. Event-notification module 300 stores the registration in event-registration data 302. For example, assume application component 114 is part of a web application and that it may register for the custom event by specifying: "<Event type="#MyCustomEvent" action="doSomething"/>." In this embodiment, upon application component 114 being loaded, event-notification module 300 detects this registration and stores it in event-registration data 302. In other embodiments, application component 114 actively calls to event-notification module 300 in order to register for the event.

Block 204 receives the event from another application component. The event data, if any, is included along with the event. Continuing the ongoing example, event-notification module 300 receives the event, including event data 308, from event-triggering module 306. Continuing the above web-application example, application component 112 can be part of a web application and this communication occurs by calling to a Uniform Resource Identifier (e.g., a Uniform Resource Locator (URL) or Uniform Resource Name (URN)) representing event-notification module 300.

In this case event data may be attached to the event in the query portion of a URL as follows:

http://mydevice:port/
        MyCustomEvent?name1=value1&name2=value2

Alternatively event data may be attached by declaring it within a separate data container of the web application, such as with the following:

<Action type="#MyCustomEvent"
        data="name1=value1&name2=value2"/>

Block 206 communicates a notification of the event to another application component. Continuing the ongoing example, event-notification module 300 performs block 206 by searching event-registration data 302 for application components that are registered to receive the same type of event (e.g., #MyCustomEvent). Finding the event-triggering application component's registration (e.g., from application component 114), event-notification module 300 communicates a notification of the event to event-reaction module 310, such as by calling a method exposed by event-reaction module 310 or placing a notification in a location that event-reaction module 310 routinely checks.

Upon, receiving this notification, event-reaction module 310 performs a predefined action, in the ongoing example "DoSomething." This action may include retrieving the event data associated with the "#MyCustomEvent" from event-data storage 304 or other functionality. For example, rather than retrieve event data, this action may log the occurrence of the event or do nothing at all.

Block 208 communicates data associated with the event to an event-data store. Continuing the ongoing example, event-notification module 300 performs block 208 by communicating the event data to event-data store 110. Event-data store 110 maintains the event data for access by application components 114 and 116. Event-data store 110 stores the event data in event-data storage 304. In this example, application components 114 access the data in response to receiving an event notification while application components 116 access the data without having received an event notification. Application components may forgo accessing the data in response to an event. In such cases application components 116 may include a data-receiving module 312 or other manner for loading the event data associated with the event. This loading of the event data may occur on initialization of application component 116, as the result of a data binding notification of updated data, as the result of a web application refresh, as the result of an update button being pushed, or by some other manner.

In one embodiment, application component 116 is part of a web application and uses data binding to access the event data by providing the following within the web application:

<Text text="{Binding Source=MyDataSource,
        Path=name1}"/>

<DataSource id="MyDataSource" url="event:MyCustomEvent"/>

In this example, a text object in the application uses data-receiving module 312 to bind to a data source named "MyDataSource." This data source points to the event data associated with the "MyCustomEvent" event. The text object is bound to the "name1" data property as provided by application component 112 and stored in event-data storage 304.

In some cases event-data store 110 expires the data source or the data itself. This expiration may be set for a specific date and time, such as 30 minutes from the time the event data was created or 5 minutes after the time the event data was first accessed by application component 114 or 116. This expiration may also be set for a particular condition, such as when the application component 112 that posted the event exits or when the computing device on which the event-data store is located restarts. At expiration, the data source and/or data is deleted.

Example Device

In the section above an example process is discussed for communicating events or event data between application components. To further illustrate this process, consider an example device in which this process may apply or operate. Set-top box 400 of FIG. 4, for example, is an example embodiment of computing device 102 of FIG. 1. Set-top box 400 includes application 402, application 404, an example of event-dispatching module 108, and an example of event-data store 110. The two applications are web applications that are separated from each other by a layer imposed by a browser application. Application 402 and 404 both have an application component 112 and 116 within them. Application 402 includes a User Interface (UI) 406 also shown in FIG. 4. Application 404 includes a UI 408 also shown in FIG. 4.

In this example embodiment, a user configures a set-top box. Application 402 provides user interface 406 through which a user specifies information, make selections, and the like. The user pushes a remote control's arrow buttons to navigate between fields. The user pushes the remote control's enter button to select a field to change. In response to selection of field 410, Application 402 triggers a "#NameFieldEntry" event with field 410's text (in this example, empty or null) included as event data in a field named "currentName". Event dispatching module 108 takes the event data and communicates it to event-data store 110, which stores it so that it can be accessed by application 404.

At this point Application 402 exits (ceases to exist) and an instance of application 404 initializes. Application 404 provides user interface 408 through which a user specifies their name. Application 404 did not exist prior to this point. Application 404 data binds to a "currentName" value of the "#NameFieldEntry" event. Through this data binding, application 404 populates field 412 with the current value of field 410 from now non-existent application 402 (in this case empty or null). The user pushes the remote control's number buttons to type their name into application 404. Upon hitting the enter button on the remote, application 404 triggers a "#NameEntered" event and includes the text from field 412 as event data. Application 404 communicates this event and event data to event-dispatching module 108, which then communicates the event data to event-data store 110. Event-data store 110 maintains the event data for applications that wish to receive it. Application 404 then exits and a new instance of application 402 initializes. This new application 402 data binds to a "name" value of the "#NameEntered" event. Through this data binding application 402 receives the event data from event-data store 110. Accordingly, application 402 populates field 410 with the name value previously entered into field 412 by the user. With the tools this is possible even though application 404 no longer exists.

Conclusion

This document describes tools capable of communicating events or event data between application components. These tools allow an application component to communicate an event and event data to another application component even if the two application components are in separate layers or do not exist at the same time. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, at an event dispatching module, an event from a first application component executed by a client device, the event including data that is associated with the event;
   communicating, from the event dispatching module, a notification of the event to a second application component without the data that is associated with the event, the second application component executed by the client device;
   communicating, from the event dispatching module, the data to an event-data store that maintains the data for access by the second application component; and
   allowing a third application component to fetch the data in the event-data store without receiving a notification of the event, the third application component executed by the client device and configured to bind to the event-data store that is associated with the event.

2. The method as recited in claim 1, wherein the event-data store is set to expire at a specific date/time, after a specific duration, when the first application component exits, or when a computing device on which the event-data store is located restarts.

3. The method as recited in claim 1, wherein the second and third application components exist within a different layer than the first application component.

4. The method as recited in claim 3, wherein the different layers isolate the first application component from the second and third application components and prevent the first application component from communicating events to the second and third application components.

5. The method as recited in claim 1, wherein the first, second, and third application components are components of different applications.

6. The method as recited in claim 1, wherein the third application component is not in existence at the time that the event is received.

7. The method as recited in claim 1, wherein the first, second, and third application components are not aware of each other's existence.

8. The method as recited in claim 1, further comprising receiving, from the second application component, a registration to receive a notification of the event.

9. The method as recited in claim 1, wherein the second application component is configured to perform an action upon receiving the notification of the event.

10. The method as recited in claim 1, wherein the first application component is configured to attach the data to the event in a query portion of a Uniform Resource Identifier.

11. The method as recited in claim 1, wherein the first application component is configured to attach the data to the event through a data container declared within the first application component.

12. An apparatus comprising:
    at least a memory and a processor configured to utilize instructions in the memory to implement:
       an event-dispatching module;
       an event-data store;
       a first application component; and
       a second application component that is initiated after the first application component exits, and
       the event-dispatching module capable of:
          receiving an event from the first application component, the event including data that is associated with the event;
          communicating a notification of the event to the second application component without the data that is associated with the event; and
          communicating the data to the event-data store; and
       the event-data store capable of:
          receiving, from the event-dispatching module, the data associated with the event;
          maintaining the data for access by the second application component;
          allowing a third application component to bind to the event-data store associated with the event and directly fetch the data from the event-data store without receiving a notification of the event; and
       the first application component, the second application component, and the third application component executed by a client device.

13. The apparatus as recited in claim 12, wherein the first application component is not in existence at the time that the third application component fetches the data.

14. The apparatus as recited in claim 12, wherein the first, second, and third application components exist within different layers.

15. The apparatus as recited in claim 14, wherein the different layers isolate the first, second, and third application components and prevent the first, second, and third application components from communicating events between each other.

16. The apparatus as recited in claim 12, wherein the first and second application components are components of the same application.

17. The apparatus as recited in claim 12, wherein the event-dispatching module is further capable of receiving, from the second application component, a registration to receive a notification of the event.

18. The apparatus as recited in claim 12, wherein the second application component is configured to perform an action upon receiving the notification of the event.

19. One or more tangible computer-readable media other than a signal per se, the one or more tangible computer-readable media having stored thereon computer-executable instructions that, when executed by a computing device, cause the computing device to perform a method comprising:

receiving, from an application component executed by the computing device, a registration to receive notifications of a predefined application-specific event;

receiving, at an event dispatching module, the predefined application-specific event from another application component executed by the computing device, the predefined application-specific event including data that is associated with the predefined application-specific event, the other application component communicating with the application component through the event dispatching module;

communicating, from the event dispatching module, a notification of the predefined application-specific event to the application component without the data that is associated with the predefined application-specific event;

communicating, from the event dispatching module, the data to an event-data store that maintains the data for access by the application component, the application component being configured to access the data maintained in the event-data store upon receiving the notification of the predefined application-specific event, the event-data store configured to maintain the data for access by an application component different than the application component or the other application component, the different application component executed by the computing device;

fetching, by the different application component, the data from the event data store, the different application component configured to bind to the event-data store to fetch the data without receiving a notification of the predefined application-specific event; and isolating the application component, the other application component, and the different application component into respective layers, the respective layers preventing direct communication of events or data between the application component, the other application component, and the different application component.

* * * * *